April 1, 1930. A. C. ESTEP 1,752,790
VALVE CAGE
Filed Jan. 28, 1926
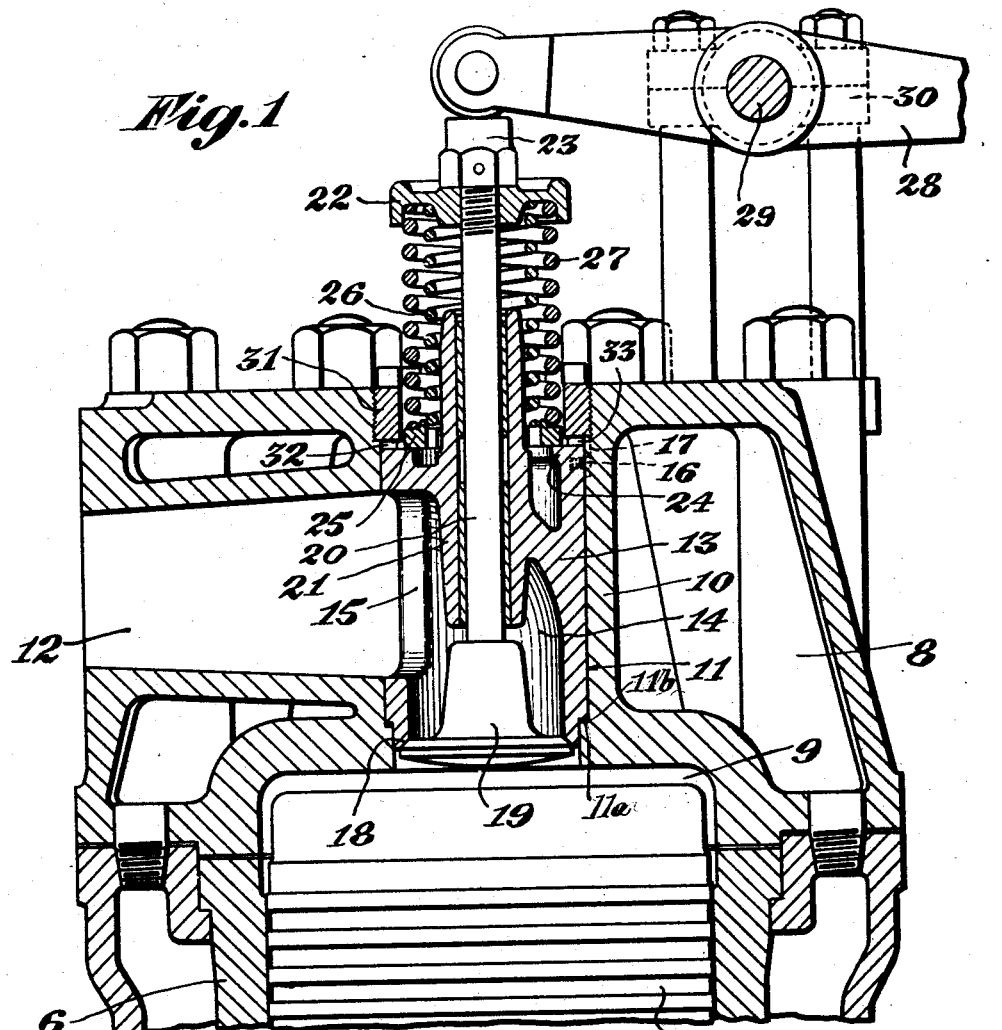
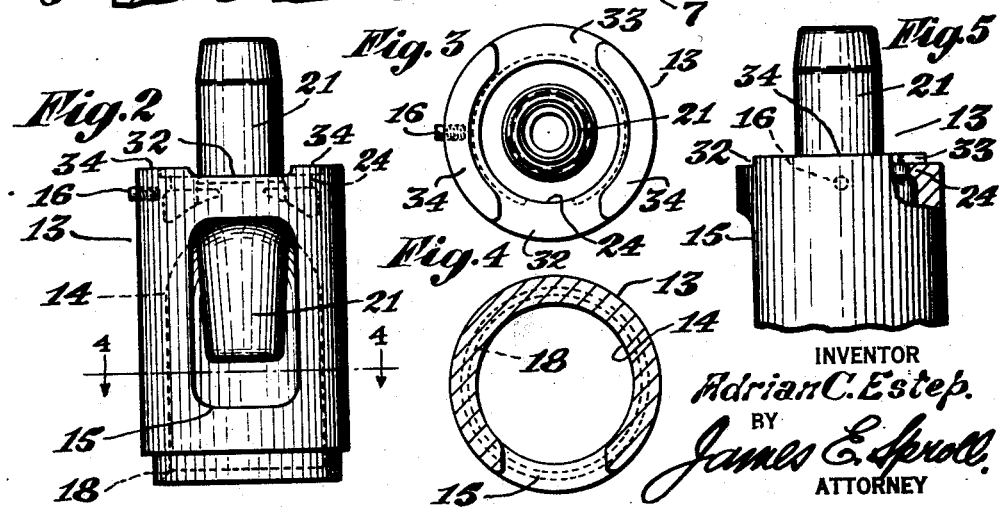
INVENTOR
Adrian C. Estep.
BY
James E. Sproll,
ATTORNEY Patented Apr. 1, 1930

1,752,790

UNITED STATES PATENT OFFICE

ADRIAN C. ESTEP, OF SEATTLE, WASHINGTON

VALVE CAGE

Application filed January 28, 1926. Serial No. 84,292.

This invention relates to novel improvements in valve cages for the inlet and exhaust valves of internal combustion engines and aims primarily to provide a valve cage for an inlet or exhaust valve fabricated in such a manner to prevent distortion of the alignment of the cage, seat and stem of said valve when the latter is operatively positioned and secured within the correlated engine thereof.

With these ends in view the invention consists in a valve cage having a port formed in the walls thereof and having the upper end of the cage walls cut away or circumferentially recessed in vertical alignment with said port, whereby the pressure at said port is relieved, when the cage is clamped or otherwise operatively secured within the correlated engine, and in consequence thereof distortion of the alignment of the correlated seat of said valve cage and the valve parts co-operating therewith, is effectually and positively prevented.

The invention further consists in the novel construction, combination, adaptation and arrangement of parts, as will hereinafter be more fully described and succinctly defined in the appended claims.

Referring now to the accompanying drawings, wherein is illustrated the preferred embodiment of the invention.

Figure 1 is a central vertical section of an internal combustion engine cylinder head structure equipped with a valve cage fabricated in accordance with the invention.

Fig. 2 is a front elevation of the valve cage removed from the correlated cylinder head structure.

Fig. 3 is a top plan view thereof.

Fig. 4 is a horizontal section taken through 4—4 of Fig. 2, and

Fig. 5 is a fragmentary side elevation of the same, with certain parts broken away.

In the drawings similar reference characters designate similar parts throughout the several views.

In Fig. 1 the numeral 6 designates a water-jacketed engine cylinder of an internal combustion engine having a piston 7 fitted for reciprocation therein, the upper end of which at top dead center projects within the concentrically recessed lower end of a water-jacketed cylinder head structure 8 suitably secured or bolted in axial alignment upon the upper end of the engine cylinder 6, whereat the said recessed lower end in conjunction with the upper end of the piston 7 periodically serve or function as a combustion chamber 9 for the said engine cylinder 6.

The engine cylinder 6 is provided with downwardly opening spring-pressed inlet and exhaust valves, preferably of the type represented by the exhaust valve disclosed in Fig. 1, and as both of said valves are equipped with valve cages identical in construction an illustration and description of one will suffice for a ready understanding of the invention.

The numeral 10 designates a housing integrally formed within the cylinder head structure 8, said housing having a counterbore 11 extending therethrough and communicating at the lower end thereof with the combustion chamber 9. Connected with and leading from the counterbore 11, at a point substantially midway the length thereof, is an exhaust or outlet passageway 12, which latter is also integrally formed within the cylinder head structure 8, as shown more clearly in Fig. 1.

Snugly fitting and removably seated within the counterbore 11 is a cylindrical exhaust valve cage 13 exteriorly shouldered at the lower end and having an arcuate bore 14 communicating with the exhaust passageway 12 through a rectangular outlet port 15 formed in the cylindrical walls of the cage 13 to normally register with said exhaust passageway 12. Fixedly secured within the cylindrical walls of the valve cage 13 adjacent the upper end thereof is an outwardly projecting radially disposed detent pin 16, the outer terminal of which is removably seated within a longitudinally disposed vertical slot 17 cut or formed within the upper walls of the counterbore 11, substantially as indicated in dotted lines in Fig. 1, whereby and whereat rotative movement of the valve cage 13 within the correlated counterbore 11 thereof is effectually prevented and the port 15 of said cage 13 is maintained and retained in proper and positive registration with the exhaust passageway 12, as will be manifest and apparent.

The arcuate bore 14 of the valve cage 13 terminates at the lower end in a valve seat 18, within which a downwardly opening valve head 19 is fitted and seated having a valve stem 20 extending upwardly therefrom through the valve cage 13 and guided for reciprocative movement within an elongated bushed boss 21, integrally formed upon the arcuate wall of the bore 14, in axial or concentric alignment within the valve cage 13, having the inner or lower end projecting within the said bore 14 and the outer or upper end projecting upwardly and outwardly beyond the plane of the upper end of the body of the cage 13, substantially as shown in Figs. 1, 2 and 5.

The valve stem 20 projects upwardly beyond the upper end of the boss 21, as shown in Fig. 1, and threadably engaged for adjustment upon the upper threaded end of said valve stem 20 is a disk-shaped spring compressing nut 22, which latter is maintained in a selected adjusted position upon the valve stem 20, by a lock nut 23.

Integrally and interiorly formed upon the cylindrical walls of the hollow upper end of the valve cage 13 slightly below the plane of the upper face thereof is an inwardly projecting annular shoulder 24, upon which normally rests or seats a spring supporting ring or annulus 25.

Interposed between the nut 22 and the ring 25 is an inner compression spring 26 and an outer compression spring 27, which serve and function to maintain the valve head 19 upon the valve seat 18, except when the same is mechanically unseated or opened downwardly by a cam operated oscillative lever 28 in normal contact with the lock nut 23 and mounted upon a rock shaft 29 journalled in bearing 30 rigidly secured to the upper face of the cylinder head structure 8.

The valve cage 13 is maintained and retained in a seated and operative position within the correlated counterbore 11 thereof by an exteriorly threaded annular clamping nut 31 threadably engaged within the upper threaded end of said counterbore, as more clearly shown in Fig. 1.

Actual experience heretofore has demonstrated that a valve cage provided with a continuous or uninterrupted annular bearing surface at its upper end for abutment with a clamping nut and having a relatively large rectangular port formed in its cylindrical walls, that end thrust or compression by the clamping nut upon such continuous annular surface subjected the portions of the valve cage walls between the ends of said rectangular port and the ends of the valve cage to excessive and unequal stress causing distortion or deformation of the alignment of such valve cage, its seat and its correlated valve stem. Consequently, in order to relieve the pressure at the port 15 of the valve cage 13 normally exerted thereon by the clamping nut 31, when the said valve cage is operatively disposed within the counterbore 11, to thereby positively and effectually prevent distortion of the alignment of the correlated cage 13, seat 18, and stem 20 of the valve 19, it has been found necessary and essential in practice to provide limited bearing surfaces for said clamping nut 31 upon the upper face of the valve cage 13, and for this purpose and to attain this end the cylindrical walls of the valve cage 13 at the upper end thereof are cut away to form and provide therein diametrically opposed recesses 32, 33, respectively, and similarly opposed arcuate clamping nut abutting portions 34 thereon. The recess 32 is preferably formed or cut in the cylindrical walls of the valve cage 13 in vertical alignment with the port 15 thereof, as shown more clearly in Fig. 2. The recesses 32 and 33 are preferably formed in diametrically opposed relation within the cylindrical walls of the valve cage 13 to more evenly and uniformly distribute the pressure normally exerted upon said valve cage by the clamping nut 31.

Manifestly, therefore, with the valve cage 13 operatively disposed and secured within the correlated counterbore 11 thereof by the clamping nut 31, as shown in Fig. 1, the pressure normally exerted by such clamping nut 31 to maintain the valve cage in operative position will be imposed and distributed upon the valve cage portions 34 only, thus relieving the valve cage port 15 from such pressure and preventing distortion of the alignment of the valve cage 13, the valve seat 18 and the valve stem 20, as hereinbefore set forth.

The valve cage of the present invention is adaptable for general use in the various types of internal combustion engines, although the same is primarily and particularly designed for use in Diesel or high compression types of internal combustion engines, wherein the valve cages are of relatively large size and are subjected to high pressures and high temperatures. In this connection it should be observed, that the smallest size of valve used in Diesel engine practice is approximately five (5") inches in diameter, and considering the high cylinder pressures approximately five hundred (500) pounds per square inch, it will be obvious that the pressure upon the valve cage 13 tending to blow the same out of the counterbore 11 is approximately five (5) tons, and in order to maintain the valve cage within its counterbore, it is necessary to exert a pressure thereon with the clamping nut 31 of double the above mentioned pressure or approximately ten (10) tons, which latter pressure together with the high operating temperature, approximately 900° Fahrenheit, if the upper end of the valve cage is formed continuous and uninterrupted, tend to and do distort the valve cage 13 and throw the valve stem 20 out of true axial alignment and cause the valve 19 to unseat slightly at one side and at a diametrically opposite point to bear hard upon only a small portion of its seat 18, all of which occurs even if the valve stem 20 is only a few thousandths of an inch out of alignment. However, by providing the diametrically opposed recesses 32 and 33, respectively, as herein shown and described, the entire pressure exerted by the clamping nut 31 upon the portions 34 is equally distributed to and passes downwardly through the solid wall sections of the valve cage located at right angles to the port 15, and is absorbed by a sealing seat 11$^a$ formed within the counterbore 11 adjacent its lower end, which sealing seat is preferably provided with a soft metallic sealing ring 11$^b$. It will thus be seen that the port 15 is entirely relieved of any excessive pressure which could in any way tend to distort same or throw the valve cage off its seat or the valve stem out of alignment.

By fabricating the valve cage 13 with the arcuate bore 14 in the manner herein shown and described it will be obvious that such bore serves and functions to accelerate the flow of the gases passing therethrough, for the reason that the said bore due to its arcuate formation, offers little if any impedance to said flow, while in the conventional types of valve cages heretofore in general use, the gases flowing therethrough were caused to impinge upon the end or side walls of the cages, which walls were normally disposed substantially at right angles to the flow of the gases, and thereby impeded flow of the same.

It is to be here understood that the upper end of the valve cage 13 may be fabricated with either a single recess 32, or with diametrically opposed recesses 32 and 33, as herein shown and described, actual practice and experience having shown that valve cages having only single recesses 32 located above the port 15 functioned very satisfactorily, but, better results were obtained when the diametrically opposed recesses 32 and 33 were employed. In so far as the valve cages for inlet valves are concerned the double recesses are not so essential, as such cages are not subjected to the high temperature stresses, to which the valve cages of the exhaust valves are subjected, it is therefore, very essential to provide the exhaust valve cages with the double recesses 32 and 33, for the reason that the high temperature of the exhaust gases causes a slight expansion of the walls of the valve cage opposite the port 15, and by recessing the upper end of the valve cage, as at 33, such recessing allows for such expansion, which latter if not allowed for would tend to distort the valve cage and its correlated parts.

While I have herein shown and described my invention with sufficient detail to enable those skilled in the art to understand the mode of construction and the principles involved, it is to be understood that there is no intentional limitation herein to the specific form and precise details of construction of the invention shown and described, except as expressly defined by the appended claims, and that various modifications of said construction may be resorted to without departing from the invention or the benefits derivable therefrom. I also desire to have it understood that certain features of the invention herein shown and described may be employed in other combinations than those herein shown.

Having thus fully described my invention, what I claim as new and desire to secure by Letters Patent is:—

1. A valve cage having a port formed in the walls thereof and having a portion of the said walls cut away at the upper end in approximate alignment with said port.

2. A valve cage having a port formed in the walls thereof and having a portion of the upper end of said walls cut away in alignment with said port.

3. A valve cage having an arcuate bore terminating at one end in a valve seat and at the opposite end in a port formed in the walls of the cage, said cage having a portion of the walls thereof cut away at the upper end in alignment with said port.

4. A cylindrical valve cage having a port formed in the cylindrical walls thereof and having diametrically opposite portions of the upper end of said walls cut away to secure more uniform distribution of pressure upon said valve cage when under compression, one of said portions being in alignment with said port.

5. In combination with an engine cylinder head structure, of a valve cage seating within said structure, having a port formed in the walls thereof and having a portion of the upper end of said walls cut away in alignment with said port, means to retain said cage within said structure, a valve disposed within said cage, and means to actuate said valve.

6. In combination with an engine cylinder head structure, of a valve seating within said structure having a port formed in the walls thereof and having a portion of the upper end of said walls cut away in alignment with said port, means to prevent rotative movement of said valve cage within said cylinder head structure, means to retain said valve cage within said structure, a valve disposed within said cage, and means to actuate said valve.

7. A valve cage having a rectangular port formed therein and having the upper face circumferentially recessed in vertical alignment with said port.

8. A valve cage having a port formed therein and having a plurality of circumferentially disposed recesses formed in the upper face thereof to secure more uniform distribution of pressure upon said valve cage when under compression, one of said recesses being in vertical alignment with said port.

9. A valve cage having a rectangular port formed therein and having the upper face circumferentially recessed at diametrically opposite points to secure more uniform distribution of pressure upon said valve cage when under compression, one of said points being in vertical alignment with said port.

10. A valve cage having a port formed therein and an annular shoulder formed upon the inner walls slightly below the plane of the upper end thereof, said cage having a circumferential portion of the cylindrical walls in alignment with said port and above the face of said annular shoulder cut away.

11. A valve cage having a port formed therein and an annular shoulder formed upon the inner walls slightly below the plane of the upper end thereof, said cage having a series of circumferential portions of the cylindrical walls thereof above the face of said annular shoulder cut away to secure more uniform distribution of pressure upon said valve cage when under compression, one of said circumferential portions being in alignment with said port.

12. In combination with an engine cylinder head structure having a passageway formed therein, of a valve cage seating within said structure having a port formed in the walls thereof for registration with said passageway and having a portion of the upper end of said walls cut away in alignment with said port, means to retain said cage within said structure, a valve disposed within said cage, and means to actuate said valve.

13. In combination with an engine cylinder head structure having a passageway formed therein, of a valve cage seating within said structure having a port formed in the walls there for registration with said passageway and having a portion of the upper end of said walls cut away in alignment with said port, means to prevent rotative movement of said valve cage within said cylinder head structure, means to retain said valve cage within said structure, a valve disposed within said cage, and means to actuate said valve.

14. In combination with an engine cylinder head structure having a passageway formed therein, of a valve cage seating within said structure having a port formed in the walls thereof for registration with said passageway, an annular shoulder formed upon the inner walls of said cage at the upper end thereof, a series of abutment portions formed upon the upper face of said shoulder out of alignment with said port to secure more uniform distribution of pressure upon said valve cage when under compression and to relieve said port of pressure means normally abutting said portion to retain the valve cage within said structure, a valve disposed within said cage, and means to actuate said valve.

15. In combination with an engine cylinder head structure having a passageway formed therein, of a valve cage seating within said structure having a port formed in the walls thereof for registration with said passageway, an annular shoulder formed upon the inner walls of said cage at the upper end thereof, diametrically opposed arcuate abutment portions formed upon the upper face of said shoulder at right angles to said port to secure more uniform distribution of pressure upon said valve cage when under compression and to relieve said port of pressure, means normally abutting said portions to retain the valve cage within said structure, a valve disposed within said cage, and means to actuate said valve.

16. In combination with an engine cylinder head structure having a passageway formed therein, of a valve cage seating within said structure having a port formed therein for registration with said passageway and having the upper face circumferentially recessed in vertical alignment with said port, an annular nut threadably engaged within said structure for retaining said valve cage within said structure, a downwardly opening spring-pressed valve seated within said cage, and means to actuate said valve.

17. In combination with a counterbored housing of an internal combustion engine cylinder head structure having a passageway communicating therewith, of an exteriorly shouldered valve cage seating within said counterbored housing having a port formed therein for registration with said passageway, an annular shoulder formed upon the inner walls of said cage slightly below the plane of the upper face thereof, said cage having a circumferential portion of the cylindrical walls in alignment with said port and above the face of said annular shoulder cut away, a valve seat formed in the lower end of said cage, a downwardly opening valve seated within said valve seat and having a valve stem extending upwardly through said valve cage and guided for reciprocation therein, a spring compressing nut threadably engaged for adjustment upon the upper end of said stem, a spring supporting ring resting upon said annular shoulder, a valve compression spring interposed between said nut and ring, and means to periodically actuate said valve.

In testimony whereof I affix my signature.

ADRIAN C. ESTEP.